June 24, 1930.                G. WALKER                1,768,176
                          MOTOR VEHICLE BRAKE
                  Filed Dec. 4, 1928           3 Sheets-Sheet 1

WITNESS
C.B. Shillinger

INVENTOR
Gus Walker
BY
Munn & Co
ATTORNEY

June 24, 1930.  G. WALKER  1,768,176
MOTOR VEHICLE BRAKE
Filed Dec. 4, 1928    3 Sheets-Sheet 2
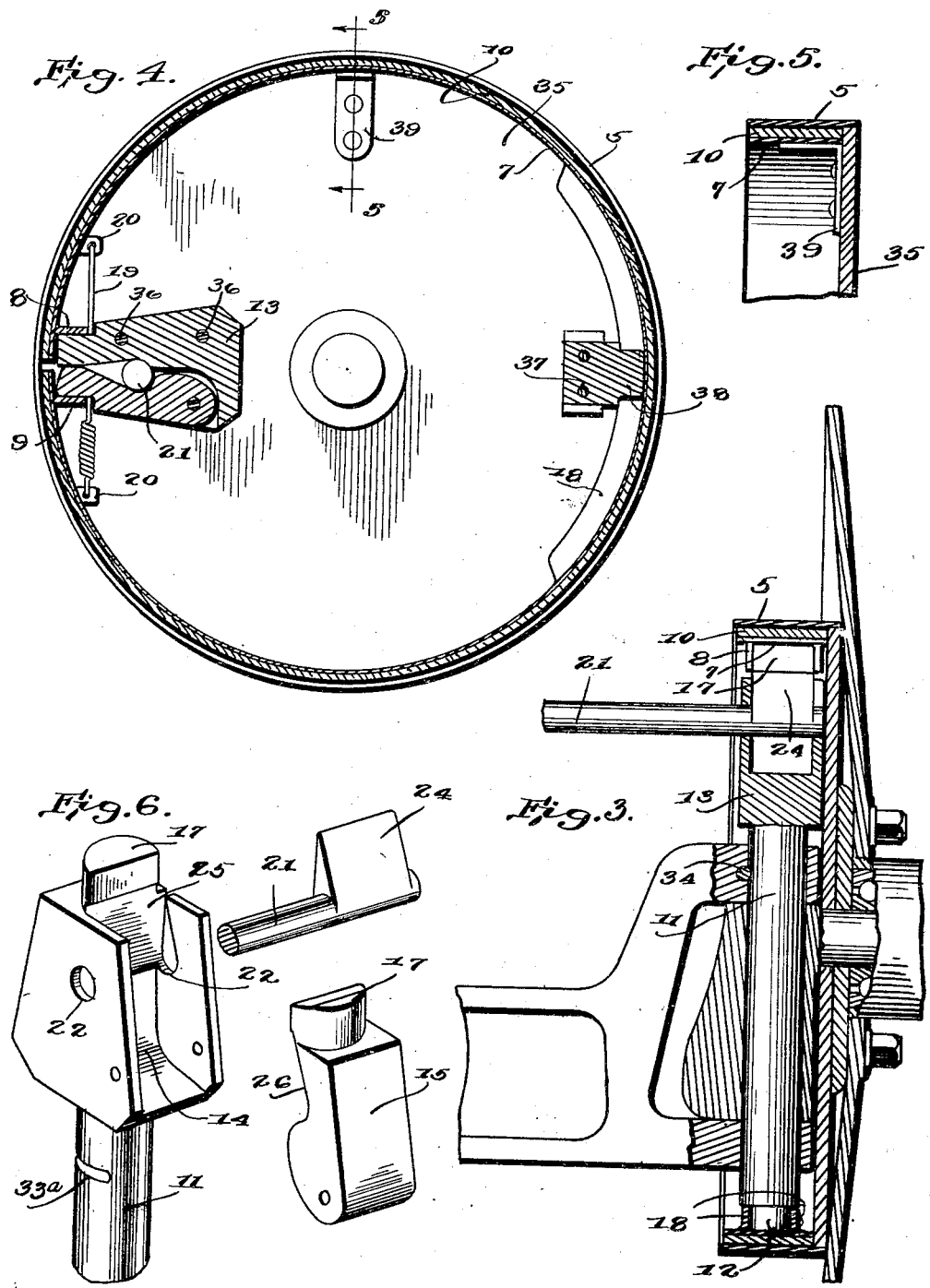
WITNESS
C.D. Shillinger
INVENTOR
Gus Walker
BY
Munn & Co.
ATTORNEY June 24, 1930.                G. WALKER                1,768,176
                         MOTOR VEHICLE BRAKE
                         Filed Dec. 4, 1928          3 Sheets-Sheet 3
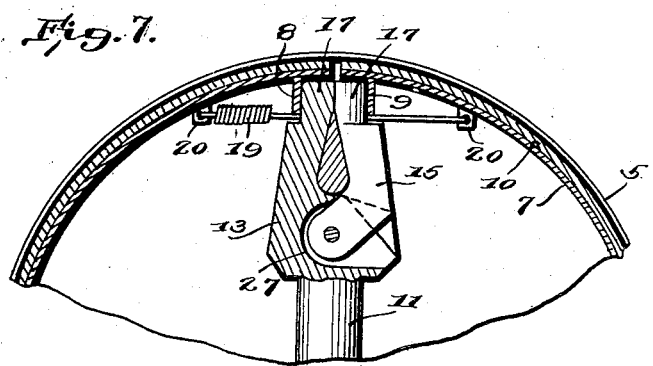
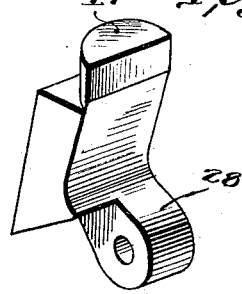
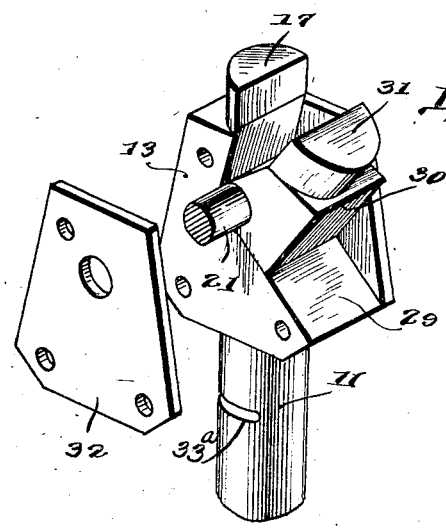
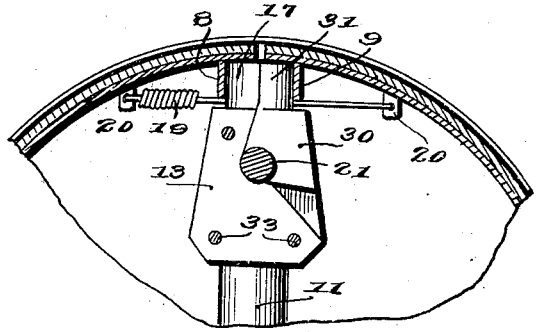
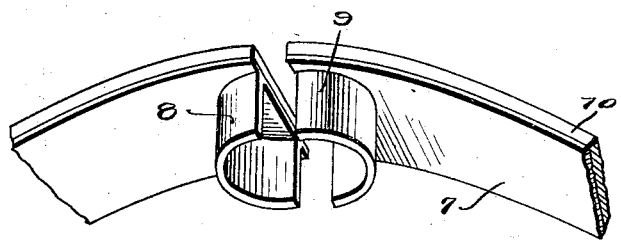
WITNESS
C. B. Shillings
INVENTOR
Gus Walker
BY
                 Munn & Co.
             ATTORNEY Patented June 24, 1930

1,768,176

UNITED STATES PATENT OFFICE

GUS WALKER, OF HUNTINGTON, WEST VIRGINIA

MOTOR-VEHICLE BRAKE

Application filed December 4, 1928. Serial No. 323,643.

My invention relates to brakes for motor vehicles and more particularly to that class of brakes embodying a brake drum and an expansible brake band.

An object of the present invention is to provide a brake wherein the entire area of the brake band is brought into frictional engagement with the brake drum to produce a maximum braking action with a minimum manual effort.

More specifically the invention provides a brake structure wherein the brake band has one end fixed or anchored and its other end movable so that upon application of operating pressure the entire band will be circumferentially expanded against the brake drum.

The invention further provides a brake structure which includes an element which serves as a front axle spindle bolt and at the same time constitutes part of the brake structure.

With the preceding and other objects and advantages in mind, the invention consists in the novel combination of elements, constructions and arrangements of parts and operations to be hereinafter specifically referred to, claimed and illustrated in the accompanying drawings, wherein:—

Figure 1:
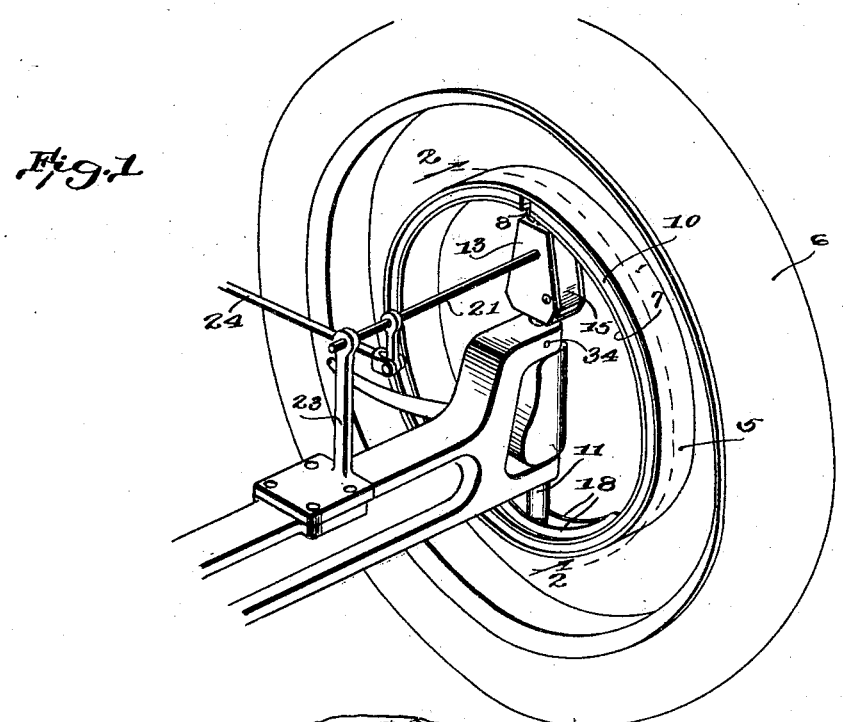
Figure 2:
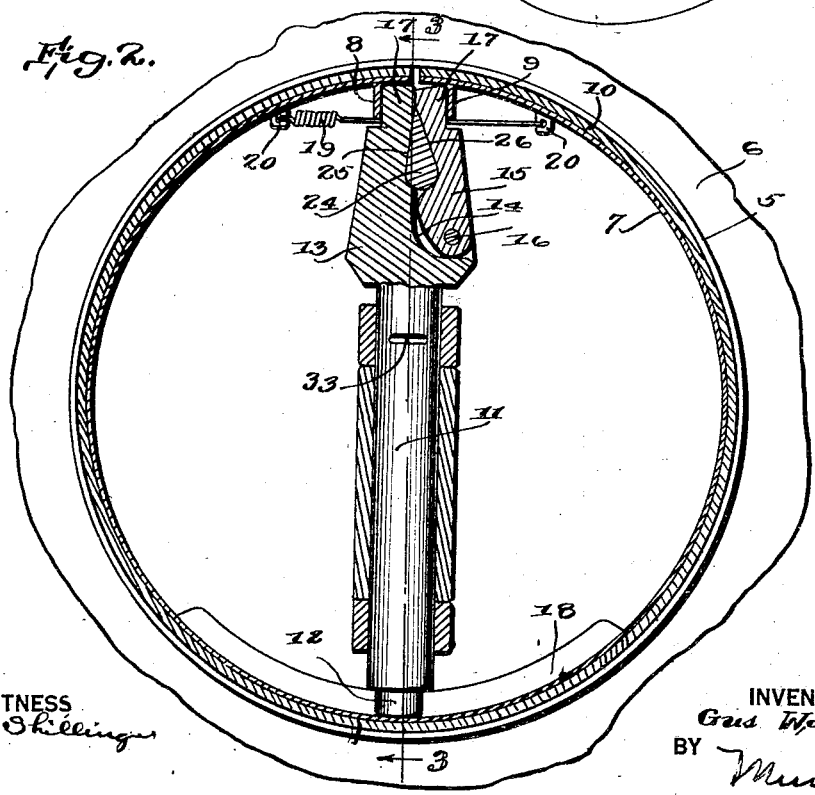

Figure 1 is a perspective of a front axle and wheel having my improved brake associated therewith, Fig. 2 is a vertical sectional view taken on substantially the line 2—2 of Fig. 1, Fig. 3 is also a vertical sectional view and taken at right angles to Fig. 2, Fig. 4 is a vertical sectional view of the device as applied to a rear wheel, Fig. 5 is a fragmentary sectional view taken on line 5—5 of Fig. 4, Fig. 6 is a perspective of certain of the cooperating elements disassembled, Fig. 7 is a fragmentary sectional view of a slightly modified embodiment of the invention, Fig. 8 is a perspective of one of the elements used in conjunction with Fig. 7, Fig. 9 is a perspective of another modification of the invention;

Fig. 10 is a fragmentary view partly in elevation and partly in section of the device disclosed in Fig. 9 in operative position in the first assembly, and Fig. 11 is a fragmentary perspective of the brake band embodied in the invention.

Referring to the invention in detail and particularly to the construction disclosed in Figs. 1 to 3, inclusive, and Fig. 6 a conventional brake drum 5 fixed to one face of a front wheel 6 is provided. Arranged within the brake drum and cooperating therewith is a split brake band whose free ends carry opposed semi-circular abutments 8 and 9. These abutments as disclosed in Fig. 11 are cast or otherwise secured to the under face of the brake band. The usual brake lining 10 is secured to and extends around the periphery of the brake band.

A brake band actuating member is provided which consists of a cylindrical shank 11 formed with a reduced lower end 12 and a head 13 at its upper end. One side of the head is formed with a recess 14 which extends from its lower end to its upper end. An arm 15 is disposed within the recess and has its lower end pivoted for movement about a horizontal axis through the medium of a pin 16 passing transversely through the lower ends of the casting and the arm. Opposed semi-circular abutments or lugs 17 are formed on the upper end of the head and arm respectively. As disclosed particularly in Fig. 1 the shank 11 passes vertically through the front axle and wheel spindle with the reduced end 12 slightly spaced from the brake band and slidably connected therewith by upstanding parallel flanges 18 extending along the opposite edges of the brake band. The head 13 is disposed in vertical alignment with the free ends of the brake band and the abutments or lugs 17 are received by the semi-circular flanges 8 and 9.

Normally the brake band is contracted by means of a contractile spring 19 whose ends are connected with ears 20 formed on the under face of the brake band adjacent its ends. In order to actuate or expand the brake band against the tension of the spring 19 a horizontally disposed rock shaft 21 has one end extended transversely through the head and is journalled therein. The opposite end of the rock shaft is journalled in an upstanding bracket or bearing 23 secured to and arising from the front axle. A cam element 24 is formed upon the inner end of the rock shaft and is confined within a recess 25 formed in the rear wall of the recess 14 below the abutment 17 of the head and a recess 26 formed in the inner face of the arm 15. This recess 26 extends from a point intermediate the ends of the arm to a point slightly below the abutment 17 of the arm. As particularly illustrated in Fig. 2 the recesses 25 and 26 together substantially conform to the contour of the cam element 24. It will be observed that one of the openings 22 is of the same contour as the cam element so that the latter may be slipped into place while the device is being assembled.

The rock shaft is operatively connected with the usual brake rod 27 so that upon shifting of the latter in longitudinal direction the rock shaft will be rocked to move the cam element 24 against the pivoted arm 15 to expand the brake band. It will be observed that upon movement of the cam into engagement with the pivoted arm the latter will actuate the arm in a forward direction. It therefore follows that by reason of one end of the brake band being anchored to the head the entire brake band will be expanded circumferentially to cause the entire length of surface of the brake band to expand against the brake drum. With reference to the modification disclosed in Figs. 7 and 8 it will be observed that the head 13 is entirely cut away at one side and is formed with a substantially circular recess 27 in which an ear 28 formed on the lower end of the arm 15 is pivotally mounted.

In the construction disclosed in Figs. 9 and 10 the head 13 is cast with a recessed face having an angularly disposed bottom wall 29 which extends from a point adjacent the lower end of the head to a point adjacent its upper end.

In this instance the rock shaft 21 has its lower end cast with a substantially rectangular enlargement 30 whose upper face is formed with a semi-circular abutment or lug 31 which is opposed to the abutment 17 on the head. A removable side plate 32 is attached to one side of the head by fastenings 33 so that the rock shaft may be assembled with the head.

In all of the embodiments of the invention above referred to the shank 11 is formed with a horizontally disposed semi-circular key way 33$^a$ which receives a transverse key 34 passing through the upper knuckle of the front axle to insure against vertical displacement of the shank. The construction disclosed in Figs. 4 and 5 is adapted for a rear wheel brake. In this instance the head 13 is secured to one face of the disc 35 of a rear axle housing in alignment with the ends of the brake band by fastenings 36. A cylindrical member 37 is also secured to the disc at a point diametrically opposite the head 13 and is formed with a reduced end 38 which projects between the flanges 18 on the brake band. An angle bracket 39 is riveted or otherwise secured to the disc to constitute an additional support for the brake band. The rock shaft extends through the disc 35 and is adapted to be operatively connected with a brake rod not shown. With the exceptions above noted, the construction and operation of the device disclosed in Figs. 4 and 5 is identical to the device disclosed in Figs. 1, 2 and 6.

What is claimed is:

1. In a brake, a brake drum, a split brake band received therein, a fixed abutment engaging one end of the band to hold the latter stationary, a movable abutment engaging the opposite end of the band, and a manually operable element interposed between the two abutments and operating against the movable abutment.

2. In a brake, a brake drum, a split resilient brake band received therein, a head arranged within the confines of the band and adjacent the ends thereof and against which one end of the band abuts, a pivoted element carried by the head and operating against the opposite end of the band whereby to expand the latter radially from end to end, and a member supported at a point diametrically opposite the head and having slidable engagement with the brake band for holding the latter against lateral displacement.

3. In a brake, a shank to be received in an automobile wheel spindle and coinciding bearings of a front axle, a head supported on the upper end of the shank, a brake band surrounding the head and having one end bearing against the latter, and a manually operable movable element attached to the head and operable against the opposite end of the band, whereby to expand the latter, and upstanding parallel flanges formed on the edges of the band and slidably receiving the lower end of the shank.

4. In a brake, a shank to be received in the spindle of a front automobile wheel and coinciding bearings of a front axle, a head carried by one end of the shank, a split brake band encircling the head and shank and having one end anchored to the head, and a manually operable pivoted element supported from the head and operating against the opposite end of the band to expand the latter from end to end, parallel flanges extending along the edges of the band and slidably receiving the opposite end of the shank therebetween to guide the band in its expansion and contraction movements.

5. In a brake, a split resilient brake band, opposed semi-circular flanges projecting from the inner face of the band at its end, fixed and movable semi-circular abutments received in the flanges, and means for moving the movable abutment in a direction to expand the band.

GUS WALKER.